US009094392B1

(12) United States Patent
Hwang

(10) Patent No.: US 9,094,392 B1
(45) Date of Patent: Jul. 28, 2015

(54) GNSS RECEIVER AUTONOMOUS SIGNAL AUTHENTICATION USING SIGNAL STABILITY ANALYSIS SYSTEM AND RELATED METHOD

(71) Applicant: Patrick Y. Hwang, Cedar Rapids, IA (US)

(72) Inventor: Patrick Y. Hwang, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 96 days.

(21) Appl. No.: 14/065,054

(22) Filed: Oct. 28, 2013

(51) Int. Cl.
*H04L 29/06* (2006.01)

(52) U.S. Cl.
CPC .................................... *H04L 63/08* (2013.01)

(58) Field of Classification Search
CPC ..... G01S 19/05; G01S 19/215; G01S 19/215; G01S 19/03; H04L 2209/80; H04L 2209/34; H04L 29/06; H04L 9/3255
USPC ...................................... 726/3; 380/255, 270
See application file for complete search history.

(56) References Cited

U.S. PATENT DOCUMENTS

| | | | | |
|---|---|---|---|---|
| 6,771,214 | B2 * | 8/2004 | Kober et al. | 342/357.29 |
| 6,816,539 | B1 * | 11/2004 | Rog | 375/147 |
| 7,363,494 | B2 * | 4/2008 | Brainard et al. | 713/168 |
| 8,948,031 | B2 * | 2/2015 | Yu et al. | 370/252 |
| 2006/0064725 | A1 * | 3/2006 | Rabinowitz et al. | 725/68 |
| 2007/0096977 | A1 * | 5/2007 | Lillo et al. | 342/357.02 |
| 2011/0181466 | A1 * | 7/2011 | Serrano et al. | 342/357.68 |
| 2012/0121087 | A1 * | 5/2012 | Psiaki | 380/255 |
| 2012/0144451 | A1 * | 6/2012 | Gutt et al. | 726/3 |
| 2013/0034124 | A1 * | 2/2013 | Peyrotte | 375/144 |
| 2013/0251150 | A1 * | 9/2013 | Chassagne | 380/270 |
| 2014/0028499 | A1 * | 1/2014 | Yeh et al. | 342/357.73 |
| 2014/0161257 | A1 * | 6/2014 | Dube | 380/258 |

* cited by examiner

*Primary Examiner* — Harunur Rashid
(74) *Attorney, Agent, or Firm* — Angel N. Gerdzhikov; Donna P. Suchy; Daniel M. Barbieri

(57) ABSTRACT

A system and method are disclosed for autonomous authentication of a received signal based on characteristics of the signal. The method receives, acquires and tracks a signal to first determine if a carrier clock phase variable associated with the signal meets a phase consistency threshold. If so, the signal is labeled authentic and configured for output to a positioning system. Second and optionally, the system may determine if a data set measurement associated with a unique satellite identification of the signal meets a data set threshold. If not, the signal is labeled as inconsistent and discarded. The system and method continuously monitors the signal for consistency as well as authenticity based on the data set threshold and the phase consistency threshold. Should any tracked signal fall below either threshold, the signal is discarded from the possible positioning solution.

21 Claims, 15 Drawing Sheets

1400

1402 receiving, acquiring and tracking at least one signal 1404 analyzing a clock phase associated with at least one tracked signal 1406 determining if the clock phase associated with the at least one tracked signal meets a phase consistency threshold 1408 labeling the at least one tracked signal as authentic if the clock phase associated with the at least one tracked signal meets the phase consistency threshold 1410 tracking at least one of the at least one tracked signal labeled authentic

A

700

800
804
806
ΔY
ΔX
Y
X
v
802
820
Probability of missed detection
830
Probability of false alarm Clock with signal-in-space and tracking noise
2nd order GM 5-s TC
ΔY 804
ΔX 806
Allan Variance
824
826
705
530
Averaging Time t (s)

GNSS RECEIVER AUTONOMOUS SIGNAL AUTHENTICATION USING SIGNAL STABILITY ANALYSIS SYSTEM AND RELATED METHOD

FIELD OF THE INVENTION

The present invention relates generally to navigation systems and methods for accurate positioning. More particularly, embodiments of the present invention relate to a system and method for signal authentication based on an analysis of artifacts present or absent in a signal to determine signal authenticity.

BACKGROUND OF THE INVENTION

Deceptive interference may be defined as transmitted signals intended to subtly mislead a targeted satellite navigation receiver. These interfering signals may overwhelm the targeted receiver with counterfeit signals generated to induce a gradual drift error in position and time as the counterfeit signals are processed by the receiver. Encryption of signals may reduce susceptibility to deceptive interference for some (e.g., military) users while others (e.g., commercial) remain vulnerable to attack. Concern for this threat may increase with increasing sophistication of electronics available to the general public.

Deceptive interference may be a major concern for vulnerable systems including commercial and military Global Positioning System (GPS) users operating on unencrypted GPS signals. Moreover, users of open access Global Navigation Satellite System (GNSS) signals may be particularly vulnerable to deceptive interference of a positioning signal.

Several approaches based on a variety of discrimination methods have been proposed but have found limited success. Most have marginal effectiveness from limitations in capabilities and/or application. For example, an angle-of-arrival discrimination based on multi-antenna sensors may find limited success. However these systems require costly additional components such as a multi-element antenna and, on a moving platform, an inertial sensor to verify results.

With the advent of newer GNSS systems, interest in using unencrypted open service signals has grown. The extra layer of encryption may be cumbersome to many users since security key management may involve tedious protocols. Civil users may be dissuaded from encryption use by these additional complexities if there are less complex alternatives which offer the same degree of assurance against deceptive interference.

Consequently, a need exists for a system and method for effective autonomous signal authentication of a received positioning signal.

SUMMARY OF THE INVENTION

Accordingly, an embodiment of the present invention is directed to a method for autonomous authentication of a received signal, comprising: receiving at least one signal, acquiring and tracking the at least one signal, analyzing a clock phase associated with at least one tracked signal, determining if the clock phase associated with the at least one tracked signal meets a phase consistency threshold, labeling the at least one tracked signal as authentic if the clock phase associated with the at least one tracked signal meets the phase consistency threshold, tracking at least one of the at least one tracked signal labeled authentic, continuously monitoring the clock phase associated with the at least one tracked signal, de-authenticating the at least one tracked signal if the clock phase associated with the at least one tracked signal does not meet the phase consistency threshold, configuring authenticated position data associated with the at least one tracked signal labeled authentic and authenticated measurement data associated with the at least one tracked signal labeled authentic for use by at least one of: a GNSS receiver and an external application, and determining a position solution based on the at least one tracked signal labeled authentic.

An additional embodiment of the present invention may provide a system and method where the tracked signal is one of: a plurality of signals emitted from a satellite vehicle and a plurality of deceptive signals imitating signals emitted from a satellite vehicle.

An additional embodiment of the present invention may provide a system and method further comprising comparing a unique satellite identification associated with at least one tracked signal to the unique satellite identification associated with a second of the at least one tracked signal; determining a consistent and authentic measurement data set associated with the at least one tracked signal using a data set measurement analysis if the comparing reveals a presence of repeated unique satellite identification; and determining an authentic measurement data set associated with the at least one tracked signal using a clock stability analysis if the comparing reveals no presence of repeated unique satellite identification.

An additional embodiment of the present invention may provide a system and method for autonomous authentication of a received signal further comprising determining if the data set measurement associated with the at least one tracked signal meets a data set threshold; labeling the at least one tracked signal as consistent if the data set measurement associated with the at least one tracked signal meets the data set threshold; continuously monitoring the data set measurement associated with the consistent at least one tracked signal; and declaring the at least one tracked signal inconsistent if the data set measurement associated with the at least one tracked signal does not meet the data set threshold.

An additional embodiment of the present invention may provide a system where analyzing a clock phase associated with at least one tracked signal further comprises use of at least one of an Allan Variance analysis, an Overlapped Allan Variance analysis, and use of confidence intervals computed for at least one of the error components of a clock including: Random walk FM, Flicker FM, .White FM and Flicker PM.

An additional embodiment of the present invention may provide a system where continuously monitoring the stability of the clock phase estimate associated with the at least one tracked signal further comprises continuous multi-track monitoring and analyzing a clock phase associated with at least one tracked signal further comprises receiving at least one consistent measurement data set, buffering the at least one consistent measurement data set, determining a clock state estimate via at least one least squares solution from a fixed satellite vehicle set, determining at least one Allan Variance sample point, determining at least one confidence interval, comparing the at least one Allan Variance sample point and the at least one confidence interval to a threshold, labeling as authentic the at least one consistent measurement data set if the comparing meets the threshold, labeling as unauthentic the at least one consistent measurement data set if the comparing fails to meet the threshold, configuring the authentic at least one consistent measurement data set for positioning system use, and determining a position based on the authentic at least one consistent measurement data set.

An additional embodiment of the present invention may provide a system where associating a first data set with the at least one tracked signal further comprises: receiving at least one set of carrier phase data, buffering the at least one set of carrier phase data, creating at least one combination of carrier phase data sets, the at least one combination including at least two of: a the first data set having a first unique satellite identification, a second data set having the first unique satellite identification and a third data set having a second unique satellite identification, the carrier phase data sets including a first variable, the first variable associated with a unique satellite vehicle identification, the at least one combination including the first variable; comparing each of the at least one combination of carrier phase data sets with a statistic norm of a post fit residuals, discarding one of the at least one combination of carrier phase data sets if the at least one combination of carrier phase data sets exceeds a test statistic threshold, determining an Allan Variance of a remaining at least one combination of carrier phase data sets, labeling as consistent the remaining combination of carrier phase data sets, and configuring the consistent combination of carrier phase data sets for positioning system use.

An additional embodiment of the present invention may provide a system for autonomous authentication of a received positioning signal, comprising a positioning signal receiver, the positioning signal receiver having a non-transitory computer readable medium having non-transitory computer readable program code embodied therein for autonomous authentication of a received positioning signal, the computer readable program code comprising instructions which, when executed by a computer device or processor, perform and direct the steps of: receiving at least one signal, acquiring and tracking the at least one signal, analyzing a clock phase associated with at least one tracked signal, determining if the clock phase associated with the at least one tracked signal meets a phase consistency threshold, labeling the at least one tracked signal as authentic if the clock phase associated with the at least one tracked signal meets the phase consistency threshold, tracking at least one of the at least one tracked signal labeled authentic, continuously monitoring the clock phase associated with the at least one tracked signal, de-authenticating the at least one tracked signal if the clock phase associated with the at least one tracked signal does not meet the phase consistency threshold, configuring authenticated position data associated with the at least one tracked signal labeled authentic and authenticated measurement data associated with the at least one tracked signal labeled authentic for use by at least one of: a GNSS receiver and an external application, and determining a position solution based on the at least one tracked signal labeled authentic.

An additional embodiment of the present invention may provide a method for automated autonomous authentication of a received positioning signal, comprising: means for receiving at least one signal, means for acquiring and tracking the at least one signal, means for optionally analyzing a data set measurement associated with the at least one tracked signal, means for optionally determining if the data set measurement associated with the at least one tracked signal meets a data set threshold, means for optionally labeling the at least one tracked signal as consistent if the data set measurement associated with the at least one tracked signal meets the data set threshold, means for analyzing a clock phase associated with at least one tracked signal, means for determining if the clock phase associated with the at least one tracked signal meets a phase consistency threshold, means for labeling the at least one tracked signal as authentic if the clock phase associated with the at least one tracked signal meets the phase consistency threshold, means for tracking at least one of the at least one tracked signal labeled at least one of: consistent and authentic, means for continuously monitoring the data set measurement and the clock phase associated with the at least one tracked signal, means for declaring the at least one tracked signal inconsistent if the data set measurement associated with the at least one tracked signal does not meet the first data set threshold, means for de-authenticating the at least one tracked signal if the clock phase associated with the at least one tracked signal does not meet the phase consistency threshold, means for configuring authenticated position data associated with the at least one tracked signal labeled authentic and authenticated measurement data associated with the at least one tracked signal labeled authentic for use by at least one of: a GNSS receiver and an external application, and means for determining a position solution based on the at least one tracked signal labeled one of: consistent and authentic.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
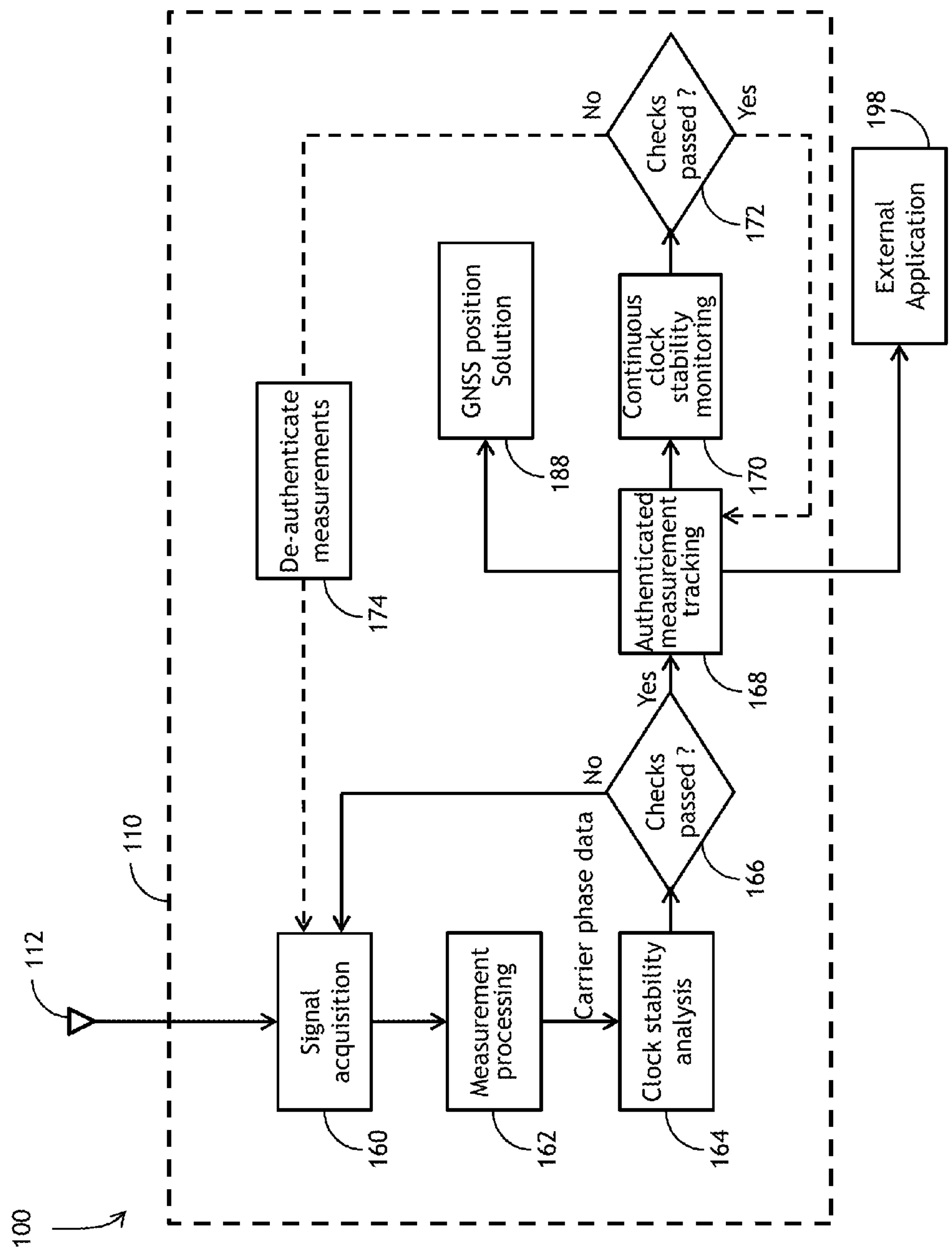
FIG. 1 is a diagram of top-level signal authentication illustrative of an embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a system and related method for autonomous authentication of a received signal based on characteristics of the signal. The method receives, acquires and tracks a signal to first determine if a data set measurement of the signal meets a consistency threshold. If not, the signal is labeled as inconsistent and discarded. Should the signal pass the consistency evaluation, the method secondly determines if a carrier clock phase variable associated with the signal meets a phase consistency threshold. If so, the signal is labeled authentic as well as consistent and configured for output to a positioning system. The signal is continuously monitored for consistency as well as authenticity based on the data set threshold and the phase consistency. Should any tracked signal fall below either threshold, the signal is discarded from the possible positioning solution Embodiments of the present invention may exploit the concept that an "artifact" is present in signals which emanate from a deceptive interferer and changes in the artifact when the targeted receiver is in motion, and use these changes in the artifact to identify the counterfeit signals. Conversely, embodiments herein may also detect an absence of the artifact and therefore, validate the authenticity of the received signals.

Embodiments of the present invention may be configured to function within the systems of present GNSS receivers with no hardware modification to the present GNSS receiver. In one implementation, the present invention may be implemented in software of a standard GPS receiver without hardware modification.

In one embodiment, the present invention may analyze carrier phase measurements of the received signals. In one embodiment, the present invention may determine a high quality estimate of the receiver clock phase (thereby detecting the presence of any artifact that might be corrupting it) by analyzing the carrier phase measurements that are usually observable in normal GPS operation.

Some GNSS receivers may operate without a carrier phase and use code phase measurements. Embodiments herein may provide a consistent and authentic signal for these GNSS receivers. An analysis of the receiver clock phase is still possible, however coarse, so the artifact detection for a code phase receiver may be limited to one of a greater magnitude.

In one embodiment, the present invention may address the authentication process in two steps: 1) identifying the "consistent" sets of signals and 2) of the consistent sets, identifying the "authentic" set.

Embodiments of the present invention adopt the notion of signal authentication to accompany signal acquisition. Signal acquisition may normally precede operation of a GNSS receiver where the time taken from startup up until the first valid navigation solution is made is often termed Time To First Fix (TTFF). With the notion of signal authentication, embodiments of the present invention introduce a separate measure of when the signal has been authenticated, thus a parallel parameter of Time To First Authenticated Fix (TTFAF) may offer the assurance of authentic signals presenting an accurate GNSS fix.

Referring to FIG. 1, a diagram of top-level signal authentication illustrative of an embodiment of the present invention is shown. Method 100 may comprise a GNSS receiver 110 receiving signals via antenna 112. A processing system that provides signal authentication must do so in a timely manner following signal acquisition 160. Method 100 commands measurement processing 162 and clock stability analysis 164 of carrier phase data. If the checks are passed at step 166 the authenticated signals may be used for authenticated measurement tracking 168. If the checks are not passed, method 100 returns to signal acquisition 160 to restart the process. After authentication, the signals are continuously monitored through continuous clock stability monitoring 170 and a check 172 to determine if the monitored signals pass. Should the checks fail to pass, method 100 may de-authenticate 174 the measurements and disregard the de-authenticated measurements from future use.

Method 100 may therefore possess the necessary information along with the requisite tools to isolate authentic signal measurements needed for valid positioning and navigation. Clock stability analysis 164 may, based on Allan Variance analysis of carrier phase data, flag the presence of counterfeit measurements so method 100 may eliminate the counterfeit measurements from use. Should method 100 find no authentic signals, it will continue to return to step 160 signal acquisition to attempt to acquire and authenticate a true positioning signal.

Method 200 may determine a position solution 188 using the authenticated measurement data to determine an authenticated position solution available to additional applications. Moreover, method 200 may configure authenticated measurement data for a specific external application 198. For example, one external application may include a navigation processor. The navigation processor may receive the authenticated measurement data and use the authenticated data for a navigation solution available to an operator.

Method 100 authentication logic may also determine reliability based on operational conditions. For example, presence of motion may be a determinative factor in reliable signal authentication. Method 100 maintains continuous clock stability monitoring 170 after authentication.

Figure 2:
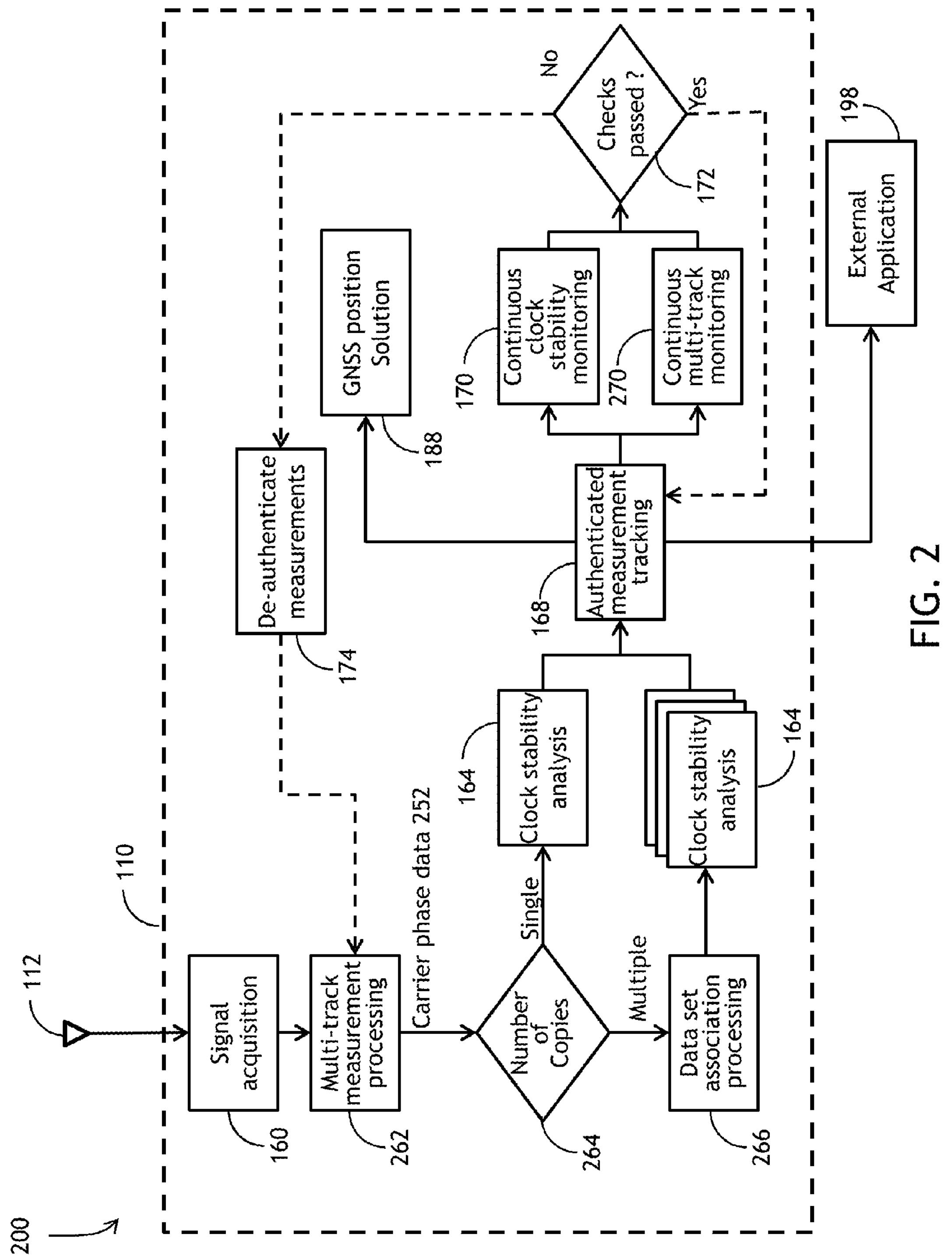
FIG. 2 is a diagram of multi-track processing signal authentication illustrative of an embodiment of the present invention.

Referring to FIG. 2, a diagram of multi-track processing signal authentication illustrative of an embodiment of the present invention is shown. Multi-Track processing may be more fully described in U.S. Pat. No. 7,764,224, "Advanced spoofer mitigation and geolocation through spoofer tracking," filed May 26, 2006, to David A. Anderson, Assignee: Rockwell Collins, the content of which are hereby incorporated by reference in their entirety. Preferably, one embodiment of the present invention may include multi-track measurement processing 262 after signal acquisition 160. In this embodiment, method 200 may process multi-track measurements of a plurality of signals. Method 200 analyzes carrier phase data 252 of each of the multi-tracked signals determining a number of copies 264. Should method 200 determine a single copy is present, the method commands a clock stability analysis 164 of the single copy. However should method 200 discover multiple copies, a counterfeit set of data is likely present and it commands data set association 266 to determine which of the data sets may be consistent.

When one or more replicas are present, one of the copies may likely be a counterfeit and method 200 may continue with additional processing of these multiple replicas. Method 200 may determine a number of copies at step 264 and send these to the data set association processing 266. Data set association processing 266 is discussed further below. After identifying the consistent sets of measurements in the data set association processing 266, method 200 may send the data to a similar clock stability analysis 164 to identify the authentic set. Through stability analysis, method 200 may authenticate the signals and continue to step authenticated measurement tracking in step 168.

As before, method 200 may continue to monitor clock stability 170 and multi-track 270 of the signals. Should method 200 find one of the monitored signals fails the checks 172, method 200 may de-authenticate 174 the measurements and exclude them from future positioning system use.

Method 200 may implement a frequency variable of how often tests and checks are executed, a frequency of times to rerun the tests if they fail, and the steps taken to de-authenticate 174 the measurements when method 200 validates the test failure. This configuration may employ the multi-track capability to maximize the availability of all signals and replicas in the operating spectrum.

Use of multi-track capability may provide method 200 with a full spectrum visibility into all available signals, authentic and potentially counterfeit data set association processing 266 may identify consistent data sets from mixed data sets while clock stability analysis 164 identifies the authentic data set. Continuous monitoring 17/270 maintained after authentication may ensure the quality of the signals.

As method 200 tracks and monitors the plurality of signals a variety of deceptive interference may be present in the signals. Deceptive Interference may be present in the form of 1) an unsynchronized threat, 2) a perfectly synchronized threat, and 3) a nearly synchronized threat.

Figure 3:
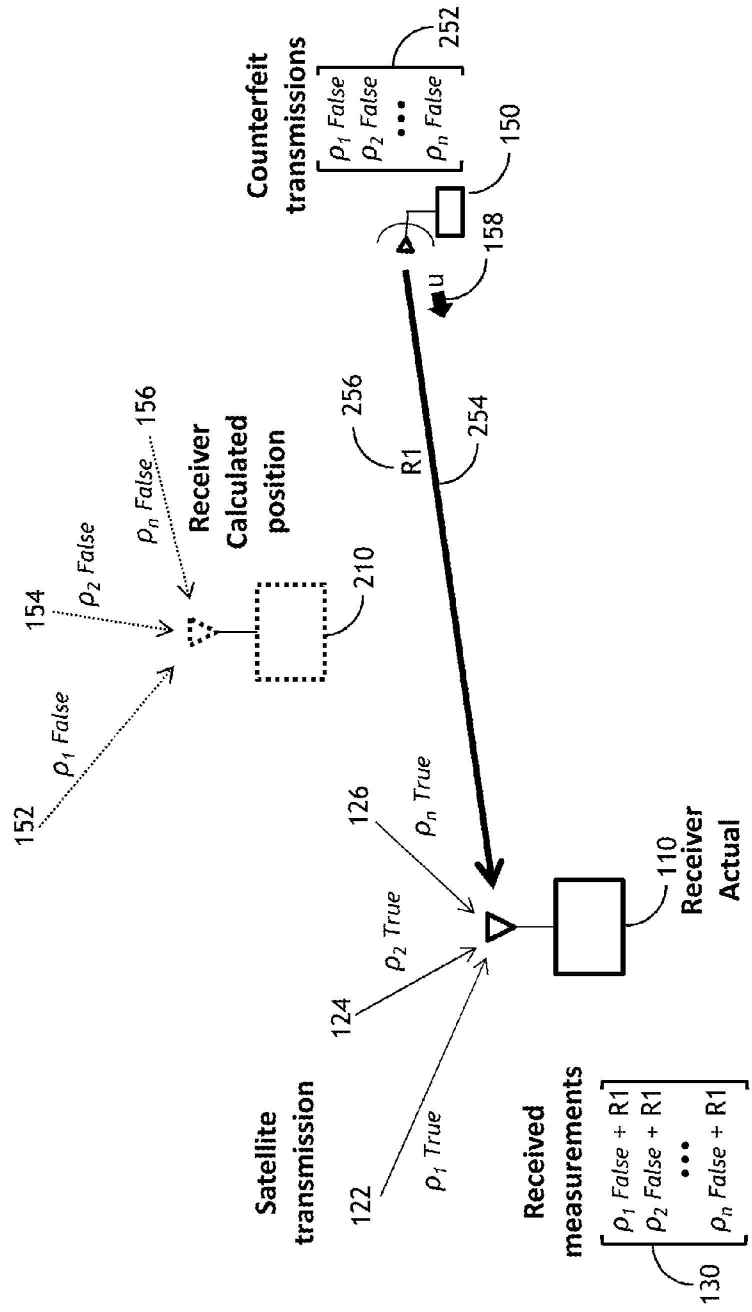
FIG. 3 is a diagram of an unsynchronized threat detectable by an embodiment of the present invention.

Referring to FIG. 3, a diagram of an unsynchronized threat detectable by an embodiment of the present invention is shown. In normal operations, a GNSS receiver 110 may receive signals 122, 124, 126 from a plurality of transmitting satellites to determine a precise position time velocity. True signals $\rho_1$True 122, $\rho_2$True 124 through $\rho_n$True 126 may be received and processed by GNSS receiver 110 to determine an accurate positioning solution.

An Unsynchronized Threat may be defined as a threat transmitting a counterfeit set of positioning signals $\rho_1$False 152, $\rho_2$False 154, $\rho_n$False 156 which are self-consistent for another location. This counterfeit set of positioning signals may actually be a single set of multiple signals through line of sight 158. The counterfeit signals are received and processed by GNSS receiver 110 leading GNSS receiver 110 to determine it is in an inaccurately calculated position 210 based on received measurements 130, where R1 256 is an extra offset due to propagation delay of the transmitted signals ρ1False 152, ρ2False 154, ρnFalse 156. The propagation delay may be presented in pseudorange measurements as a common element which is ordinarily absorbed into an estimated clock state and ignored if only the position solution is relevant to a user.

Figure 4:
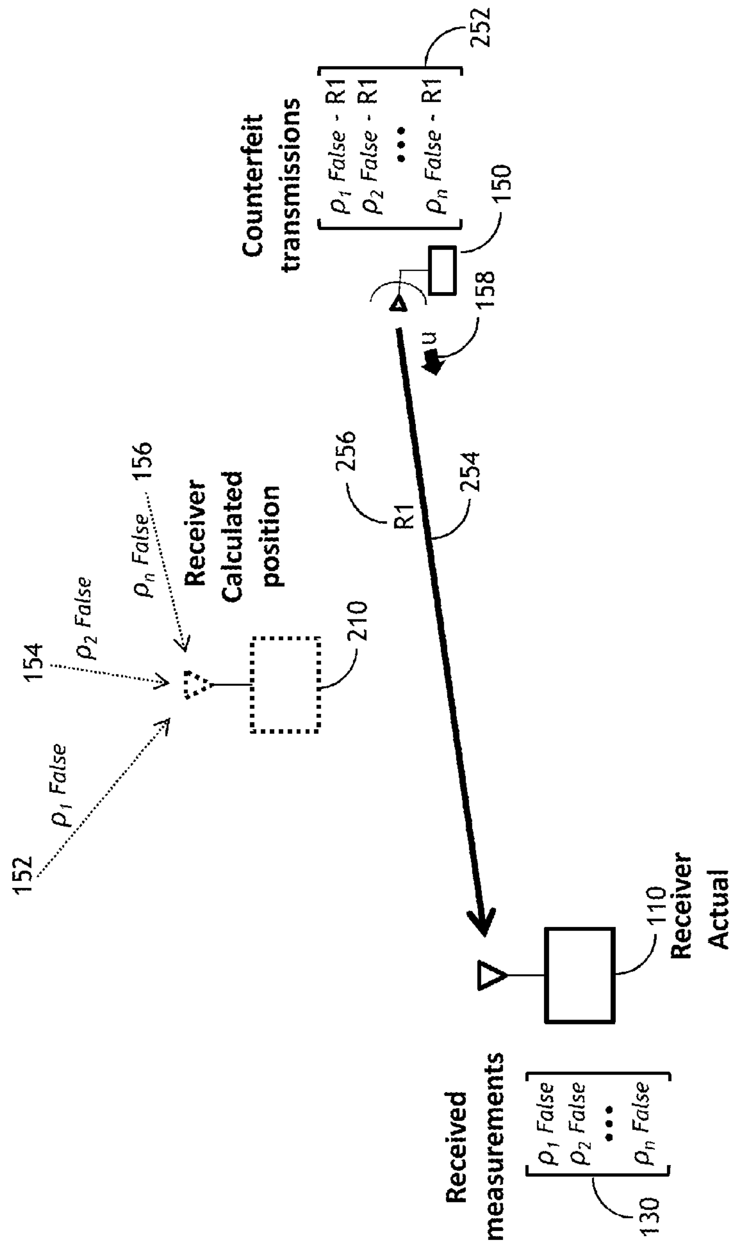
FIG. 4 is a diagram of a synchronized threat detectable by an embodiment of the present invention.

Referring to FIG. 4, a diagram of a synchronized threat detectable by an embodiment of the present invention is shown. A Perfectly Synchronized Threat may be defined as a threat presenting signals which are corrected for propagation delay prior to transmission. Even greater effectiveness in deceptive interference may be achieved if the counterfeit transmissions 254 take into account knowledge of the GNSS receiver's 110 true location in relation to the transmitter to achieve perfect synchronization. The extra offset R1 256 may be "pre-removed" from the counterfeit transmission 254 set of positioning signals ρ1False, ρ2False, ρnFalse 252 to induce an undetectable error in the positioning calculation from receiver measurements 130.

However, knowledge of the GNSS receiver 110 true location requires perfect and timely geolocation by the threat 150 at the source of the deceptive interference. Thus, perfect synchronization may be a challenge for threat 150 which is not collocated with GNSS receiver 110.

Figure 5:
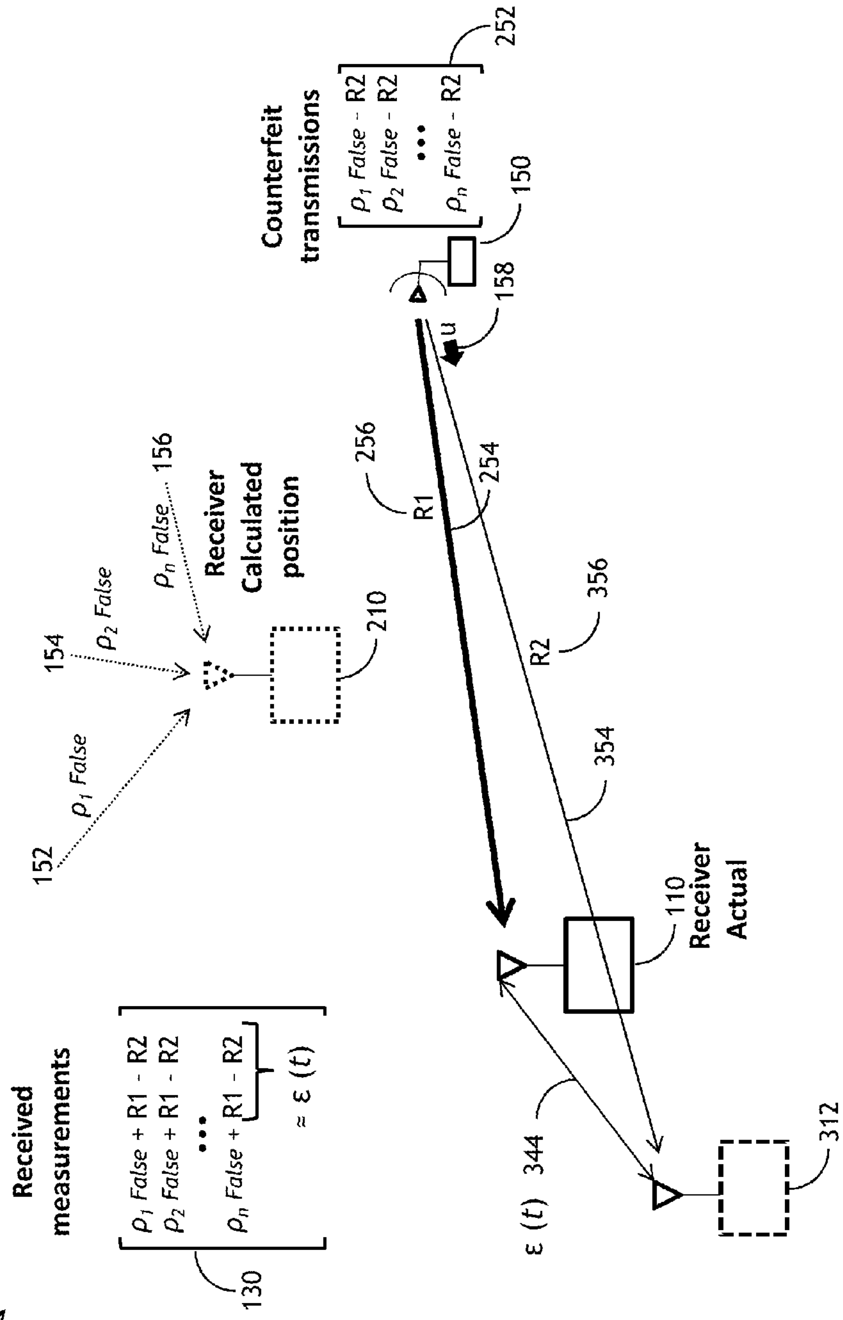
FIG. 5 is a diagram of a nearly synchronized threat detectable by an embodiment of the present invention.

Referring to FIG. 5, a diagram of a nearly synchronized threat detectable by an embodiment of the present invention is shown. A Nearly Synchronized Threat may be defined as a threat 150 able to inaccurately determine a position of the GNSS receiver 110 and attempt to deceptively interfere with the GNSS receiver 110 calculations. Should GNSS receiver 110 be mobile having a motion 312, any geolocation error ϵ (t) 344 made along the line-of-sight u 158 may introduce a dynamic component that stands out from the stable dynamics of the intrinsic clock. This dynamic component may be defined by R1 256 included in signal 254 compared with R2 356 included in signal 354. Received measurements 130 may possess the dynamic component which is one source of method 200 analysis. This dynamic component (e.g. imperfection) presents the artifact that gets lumped with the intrinsic clock and their combined dynamics becomes one basis for method 200 detecting the presence of deceptive interference.

Figure 6:
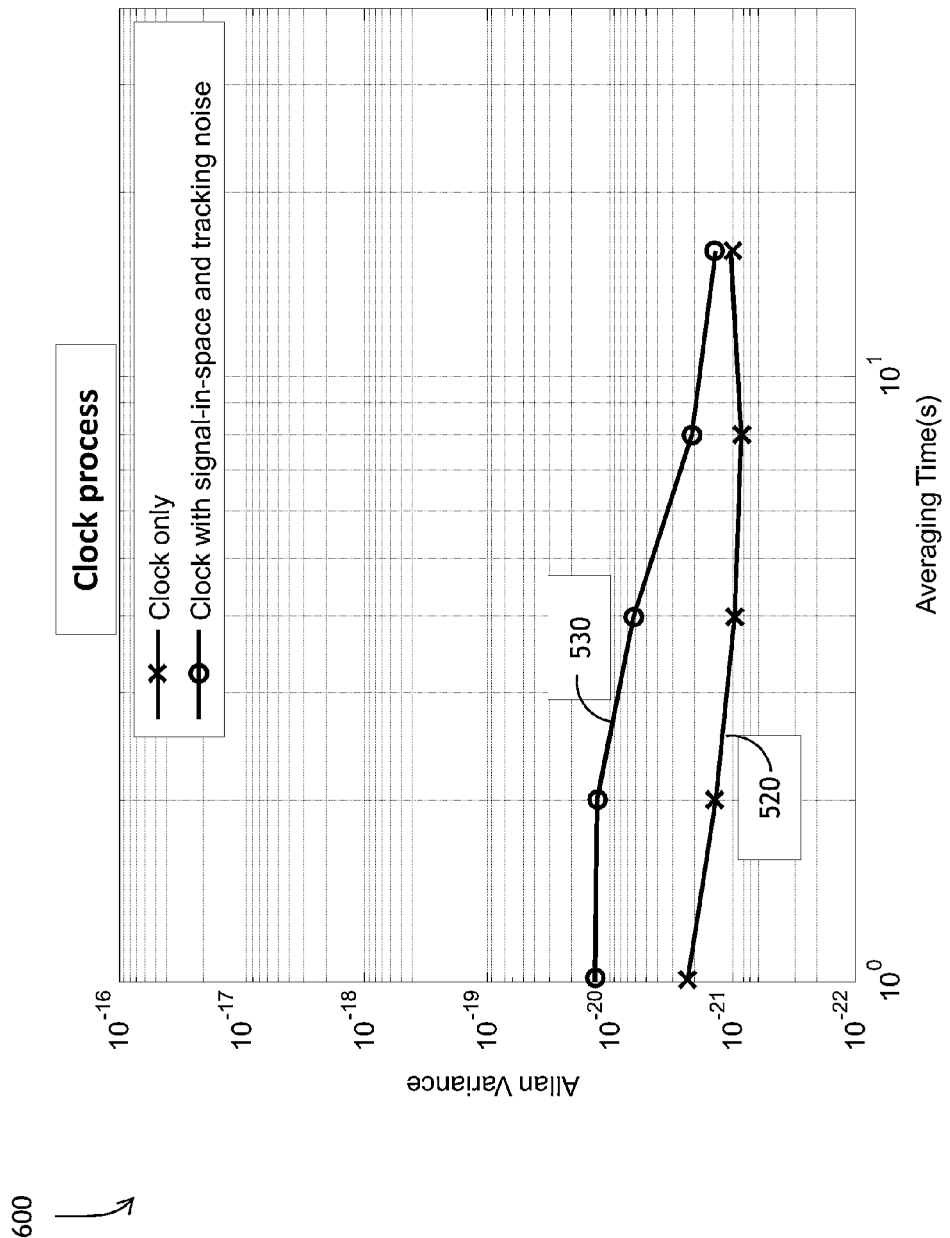
FIG. 6 is a graph of Allan Variance over averaging times of clock process and clock with signal in space and tracking noise exemplary of an embodiment of the present invention.

Referring to FIG. 6, a graph of Allan Variance over averaging times of clock process and clock with signal in space and tracking noise exemplary of an embodiment of the present invention is shown.

Method 200 may include signal analysis to determine a presence of an artifact. Under nominal conditions, systems including a GNSS receiver 110 clock may rely on the clocks for maintaining a predictable level of frequency stability. This predictability may be characterized by an Allan Variance measure of stability. Method 200 may observe the GNSS receiver 110 clock phase error through the estimation of the clock state in a navigation solution. Method 200 may analyze a time series sequence of these clock state estimates over a short duration to determine if the sequence contains extraneous elements associated with deceptive interference.

A graph of the intrinsic clock stability as characterized in laboratory test equipment 520 may produce smaller values than a graph of clock stability 530 observed from measurements in accordance with method 200 because of the added signal-in-space and tracking noise elevating its Allan Variance at lower averaging times. However, the intrinsic clock stability characteristics 520 are not observable in an autonomously operating GNSS receiver. Rather, only the clock stability characteristics 530 are observable.

The Allan Variance measure is well defined, but method 200 may employ several variations of the basic method. For example, method 200 may also consider forms of the Allan Variance that may operate on the estimated clock phase samples. Method 200 analysis of the dynamic component may yield a consistent result indicating deceptive interference from a nearly synchronized threat 150.

Figure 7:
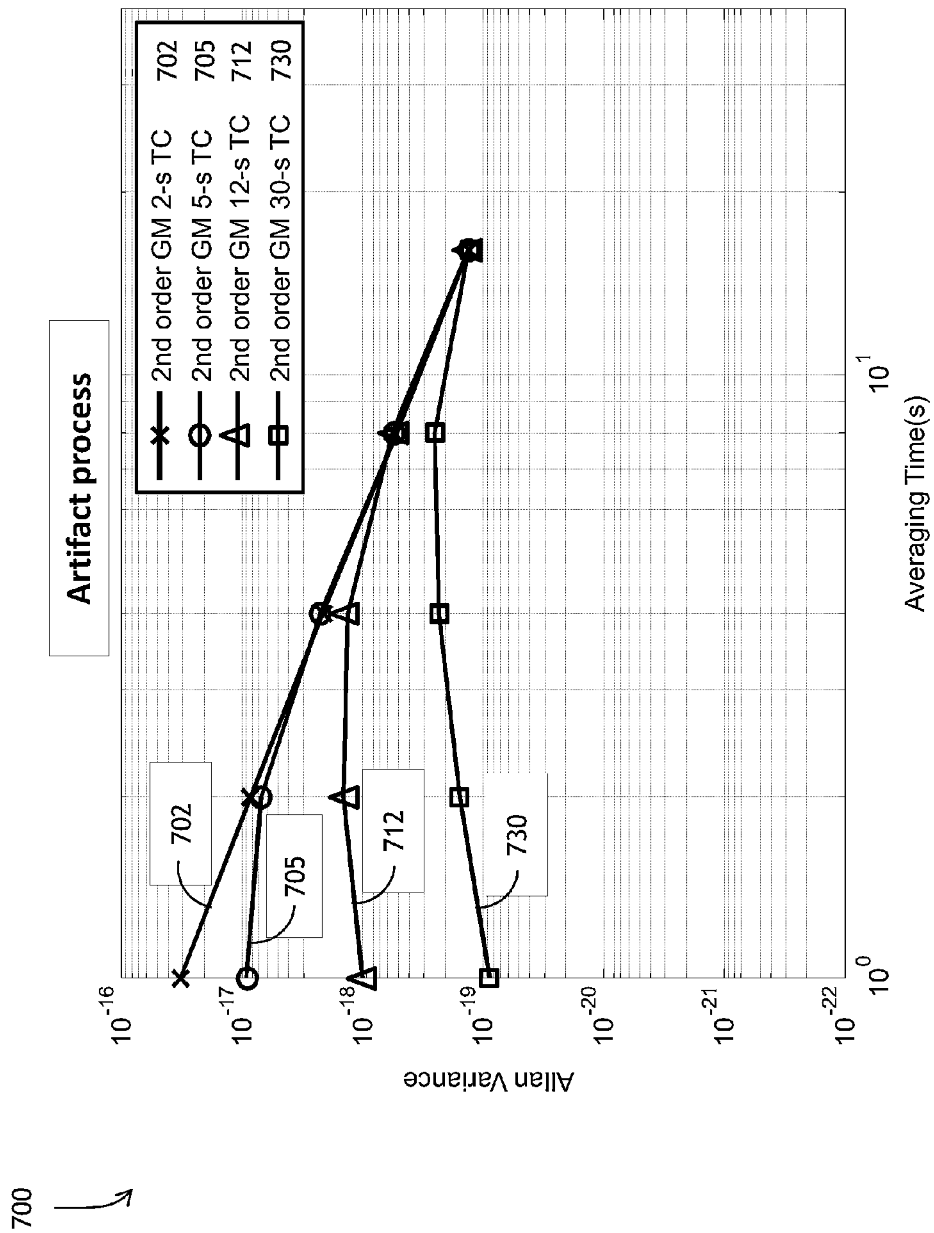
FIG. 7 is a graph of Allan Variance over averaging times of artifact process exemplary of an embodiment of the present invention.

Referring to FIG. 7, a graph of Allan Variance over averaging times of artifact process exemplary of an embodiment of the present invention 7, a graph of Allan Variance over averaging times of artifact process exemplary of an embodiment of the present invention is shown. Method 200 may determine presence of the artifact within a counterfeit set of signals which includes a certain amount of geolocation errors. Method 200 may discriminate differences in stability between the clock process versus an artifact process (e.g., approx. 2nd order Gauss Markov) based on Allan Variance analysis. Clock process (FIG. 6) must account for measurement noise based on carrier phase measurements. Here, the artifact may be indicated by a 2nd Order Gauss Markov (GM) process of varying time constants (TC). Plots of exemplary $2^{nd}$ order GM TC of 2-s 702, 5-s 705, 12-s 712 and 30-s 730 are shown. FIG. 7 processes are normalized to 1-m sigma.

Figures 8A, 8B:
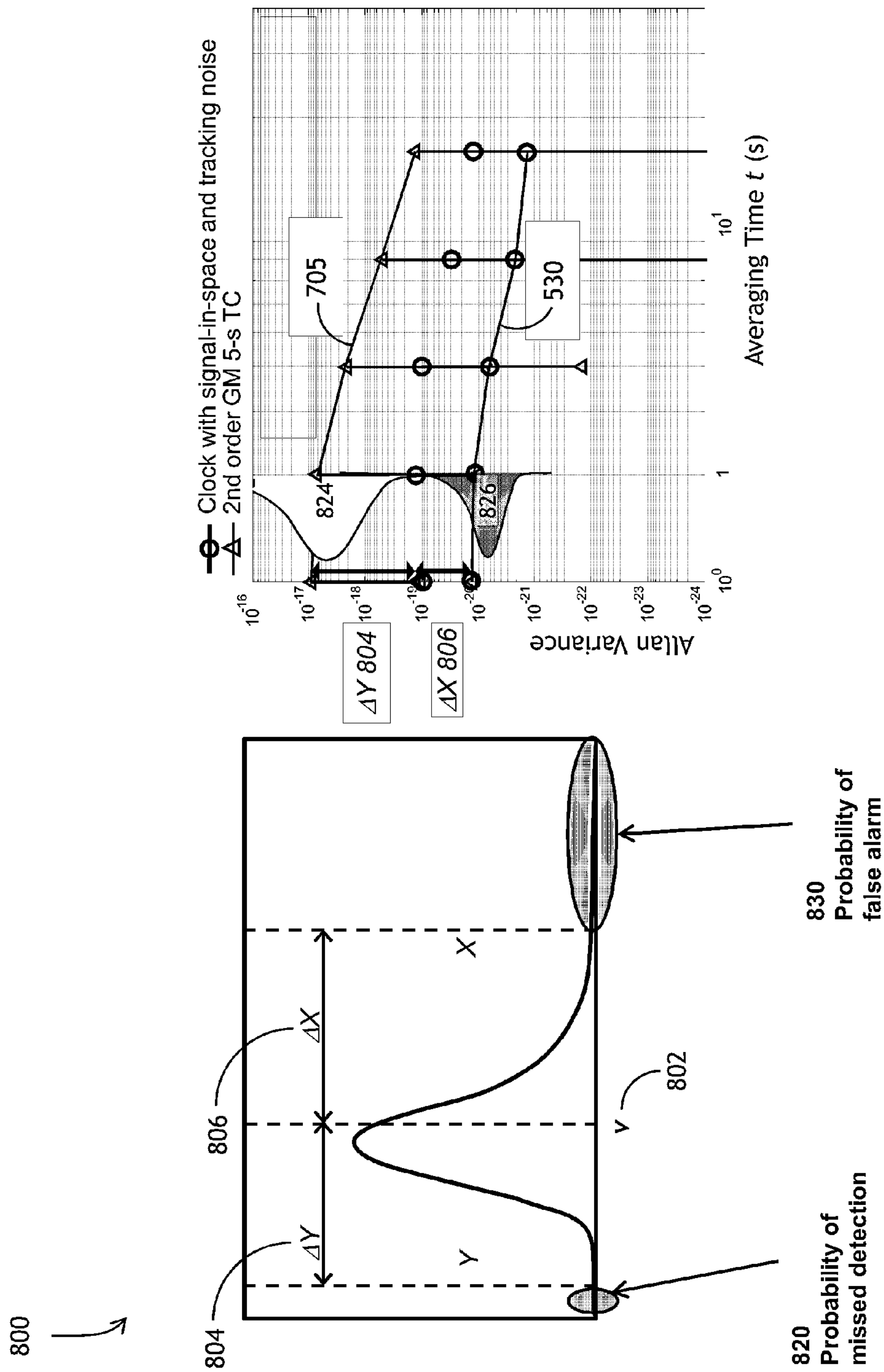
FIGS. 8A and 8B are diagrams of confidence intervals for statistical testing of clock process and artifact process distributions illustrative of an embodiment of the present invention.

Referring to FIGS. 8A and 8B, diagrams of confidence intervals for statistical testing of clock process and artifact process distributions illustrative of an embodiment of the present invention 8A and 8B, diagrams of confidence intervals for statistical testing of clock process and artifact process distributions illustrative of an embodiment of the present invention are shown. In FIG. 8A, given knowledge of the nominal statistical distribution (of the clock), method 200 may correctly determine the presence of an approximately known statistical distribution (of the artifact). One basis of the test is whether Allan Variance estimates of the artifact fall below a threshold set up for the clock. If they fall above, then method 200 may correctly detect the presence of the artifact. Should the Allan Variance estimates fall below 820, a method used may miss the artifact presence to a degree of probability that can be calculated.

Similarly, method 200 may employ a confidence interval for the clock process with a probability of false alarm 830 above a certain threshold. Within threshold values (X and Y) between a value of degrees of freedom v 802 plus an upper threshold ΔX 806 and v minus an interval ΔY 804 below the sample mean, method 200 may validly determine the presence of the artifact with certainty.

FIG. 8B details exemplary clock phase estimated carrier phase measurements. Method 200 may determine presence of the artifact here as an exemplary second-order Gauss-Markov process with a one-meter sigma and a 5-second time constant 705 and the clock with signal in space and tracking noise 530. Confidence intervals for ΔX 806 and v minus ΔY 804 are indicated at 826 and 824 respectively.

In FIG. 8B, method 200 detectability of the artifact may be indicated for different averaging intervals. At t=1, the two confidence intervals do not overlap which strongly favors method 200 detectability of the artifact. This separation between the two confidence intervals narrows for Allan Variance samples at the longer averaging intervals, especially for t>2.

Confidence intervals employed by method 200 may be calculated from analytical models based on sample statistics of clock and artifact process distributions and used to establish quantitative thresholds/bounds to quantify detectability performance. Method 200 detectability performance may be improved by a longer data record and higher rate samples. In practice, a typical operational time frame within which method 200 may actively determine signal authenticity may be 30 seconds to approximately two minutes.

Figure 9:
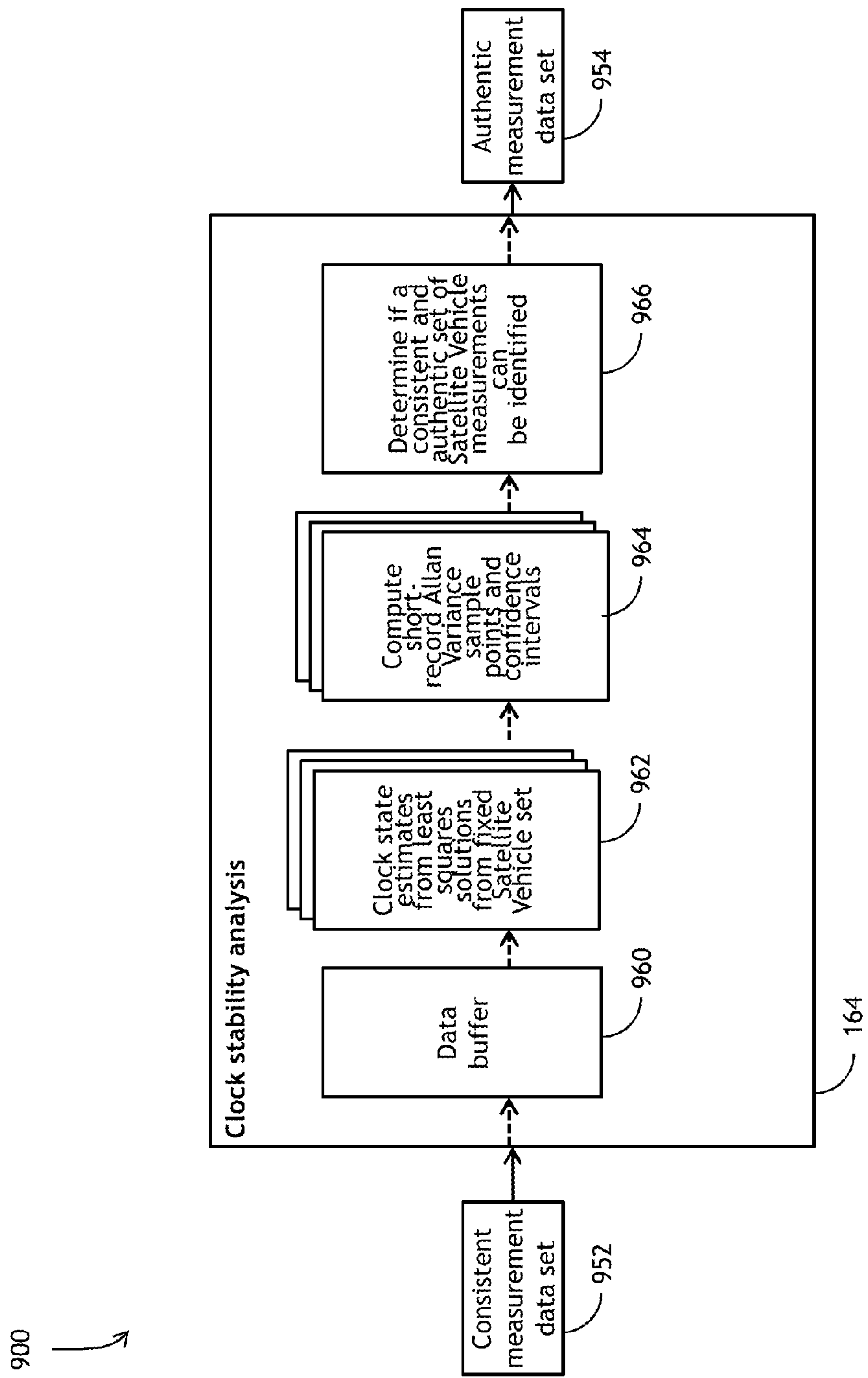
FIG. 9 is a diagram of detailed clock stability analysis illustrative of an embodiment of the present invention.

Referring to FIG. 9, a diagram of detailed clock stability analysis illustrative of an embodiment of the present invention is shown. Sub process 900 of method 200 may begin at step 952 with receiving at least one consistent measurement set, buffering the received data 960, determining clock state estimates from least squares solutions from fixed Satellite Vehicle set 962. Sub-process 900 continues at step 964 with computing short-record Allan Variance sample points and confidence intervals, and at step 966, determining if a consistent and authentic set of Satellite Vehicle measurements can be identified. If the answer to step 966 is positive, sub-process 900 may declare an authentic measurement data set at step 954.

Figure 10:
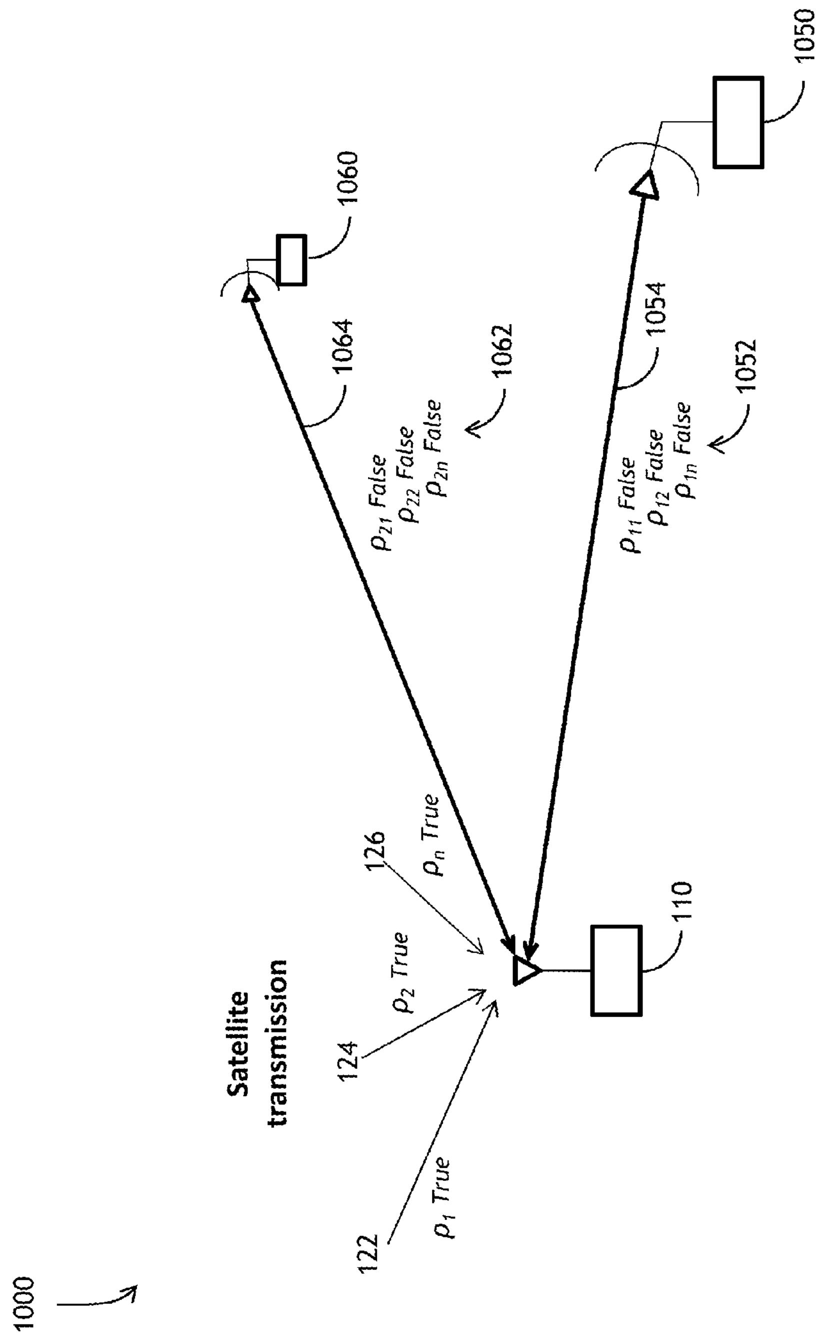
FIG. 10 is a diagram of an exemplary multi-track data set presentation detectable by an embodiment of the present invention.

Referring to FIG. 10, a diagram of an exemplary multi-track data set presentation detectable by an embodiment of the present invention is shown. With multi-track capability, a GNSS receiver 110 may receive multiple sets of measurements, including the authentic signals set 122, 124, 126. Method 200 clock stability analysis may assume consistent data sets and may operate to analyze unique satellite signal measurements, both authentic and counterfeit, that form a consistent solution. Method 200 tracking multiple sources of signals may pose an added dilemma of mixed data sets and the problem of how to identify consistent data sets from them. One method of "Brute force" identification may yield $M^N$ possible combinations (M−1 counterfeit sets and N satellites) to resolve. Method 200 may evaluate norm of the post-fit residuals (magnitude of the vector of post-fit residuals) where consistent combinations result in small post-fit residuals commensurate with pseudorange noise levels. In one embodiment, method 200 may use a minimal set (e.g., N=5) to reduce the number of possible combinations for computational efficiency. Using a number smaller than the minimal set may produce no useful information to test for consistency.

In a multi-track environment, embodiments of the present invention may operate to determine the authenticity of each of the multi-tracked signals. Threat transmitters 1050 and 1060 may transmit counterfeit signals 1054 1064 including $\rho_{1n}$ False 1052 and $\rho_{2n}$ False 1062 signals as copies of actual signals 122, 124, 126 from actual satellites. For example, should two of the signals be identical (e.g., one signal ρ1True 122 from an actual satellite and one signal μ1False 1052 from a threat transmitter), method 200 may determine which of the identical signals is authentic and which of the signals is counterfeit.

Figure 11:
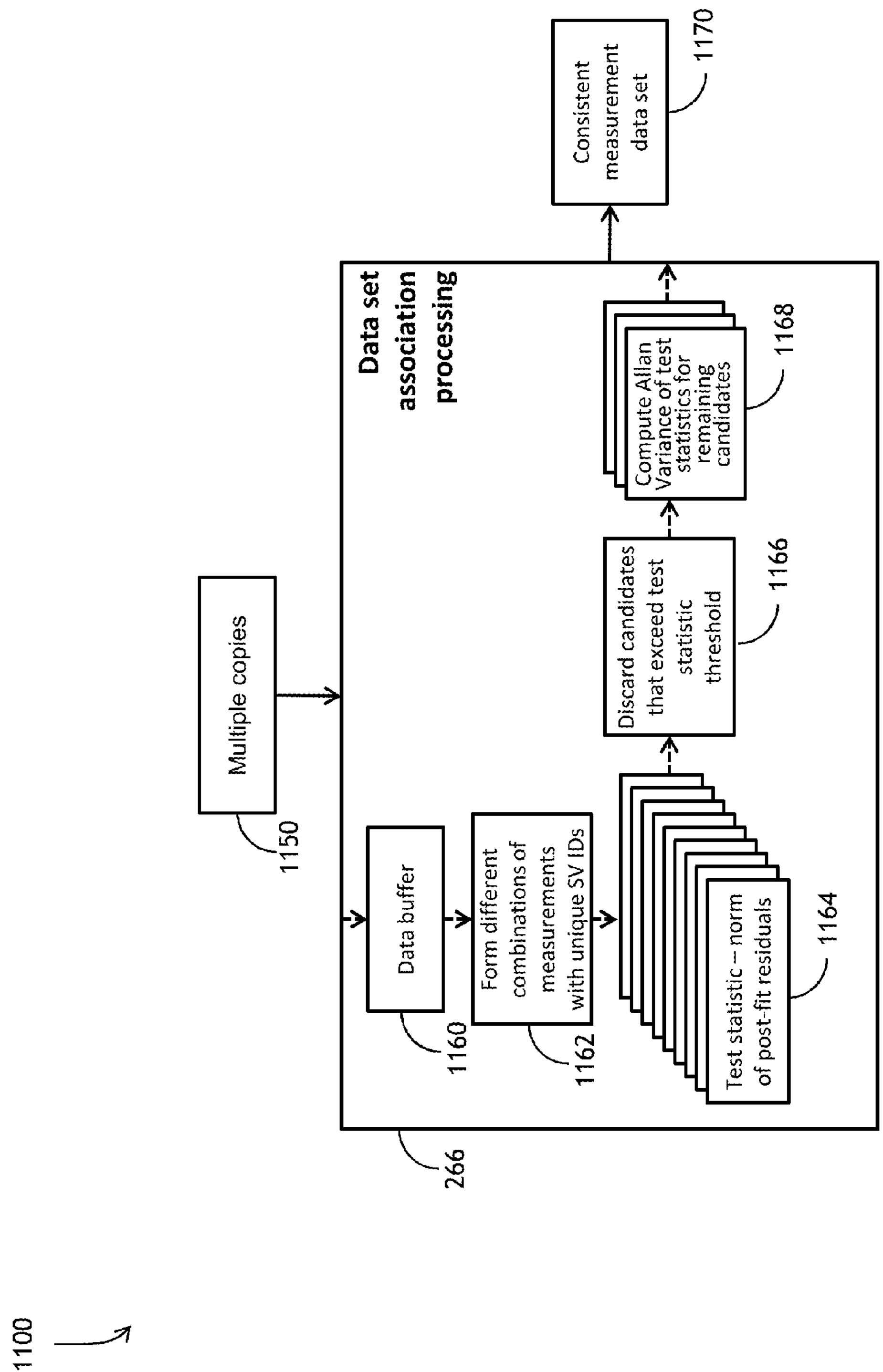
FIG. 11 is a diagram of a detailed sub-process of exemplary data set association illustrative of an embodiment of the present invention.

Referring to FIG. 11, a diagram of a detailed sub-process of exemplary data set association illustrative of an embodiment of the present invention is shown. Sub-process 1100 of method 200 may begin at step 1150 with receiving multiple copies of carrier phase data 252, buffering received data at step 1160, and forming different combinations of measurements with unique satellite vehicle (SV) identification at step 1162. Step 1164 tests statistic—norm of post fit residuals, step 1166 may discard candidates that exceed a test statistic threshold. The second stage of the data set association sub-process may analyze the stability of the post-fit residuals vector magnitudes for the remaining candidate sets left over from the first stage. Step 1168 may compute Allan Variance of test statistics for remaining candidates, and step 1170 may output at least one consistent measurement data set.

Figure 12B:
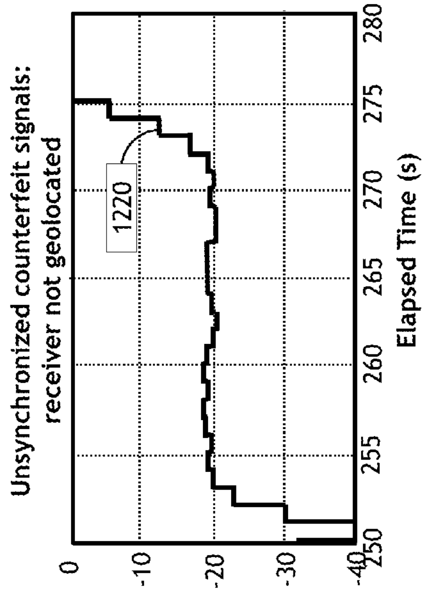
FIGS. 12A, 12B and 12C are graphs of clock first difference over elapsed time for synchronized, unsynchronized and authentic signals detectable by an embodiment of the present invention.
Figure 12A:
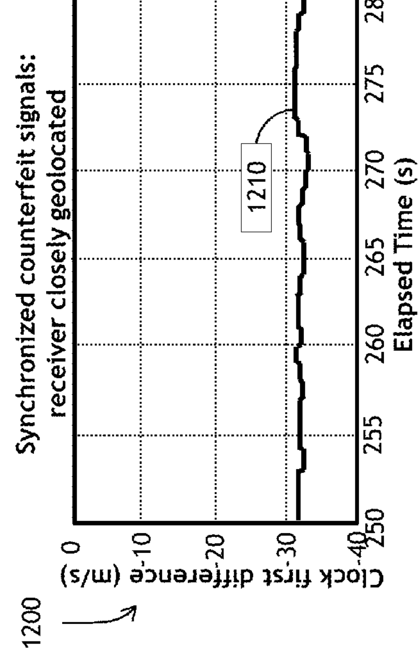
Figure 12C:
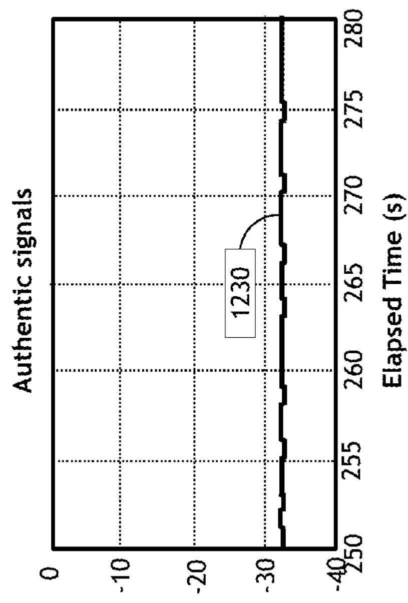

Referring to FIGS. 12A, 12B and 12C, graphs of clock first difference over elapsed time for synchronized, unsynchronized and authentic signals detectable by an embodiment of the present invention are shown. Over an exemplary 30 second period from 250 to 280 second elapsed time frame, the three plots for method 200 analysis may indicate the method ability to detect a clock first difference (representing change in clock phase or average frequency over one second) from each of the signals.

In FIG. 12A, a relatively flat curve 1210 is shown of synchronized counterfeit signals where the threat 150 maintains a highly accurate geolocation of the GNSS receiver 110. FIG. 12B indicates the divergence from authentic and an increasing divergence with time the curve 1220 may allow method 200 to identify. FIG. 12C indicates a similar flat curve 1230 of authentic signals.

Figure 13:
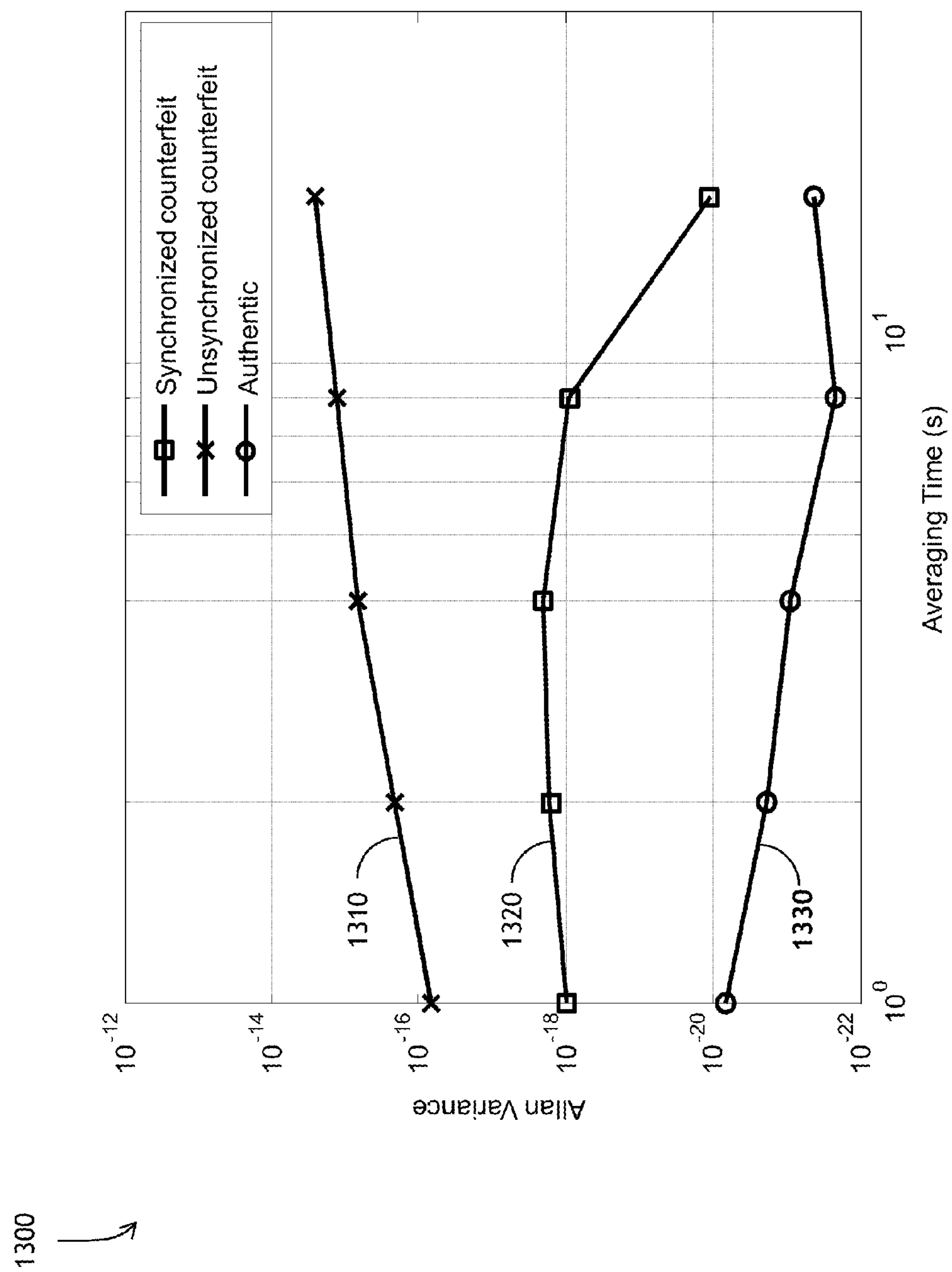
FIG. 13 is a graph of Allan Variance over averaging time of a synchronized threat, an unsynchronized threat and authentic signals detectable by an embodiment of the present invention.

Referring to FIG. 13, each graph of Allan Variance over averaging time of a synchronized threat, an unsynchronized threat and authentic signals detectable by an embodiment of the present invention is shown. Here, method 200 computed Allan Variances indicate, for synchronized 1320, unsynchronized 1310 and authentic signals 1330 indicating the authentic signals divergent from the threat signals.

The Allan Variance plots of FIG. 13 confirm method 200 ability to determine a deceptive signal from an authentic signal, in that the distinction between the clock solution using authentic signals and that using counterfeit signals, synchronized or unsynchronized, can well be exploited to be a viable basis for an authentication test.

Figure 14:
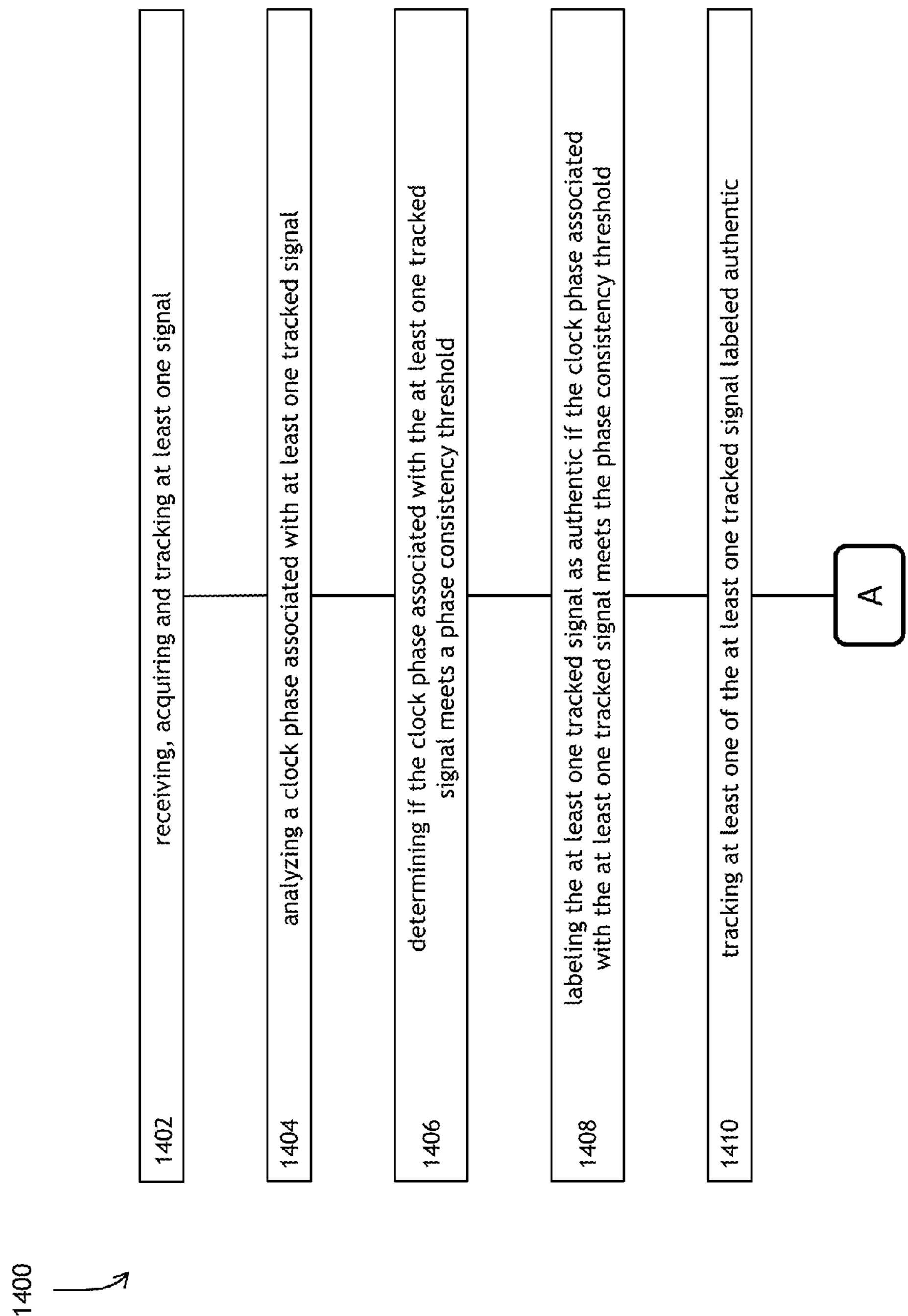
FIGS. 14 and 15 are a flow chart of a method for authenticating received signals illustrative of an embodiment of the present invention.
Figure 15:
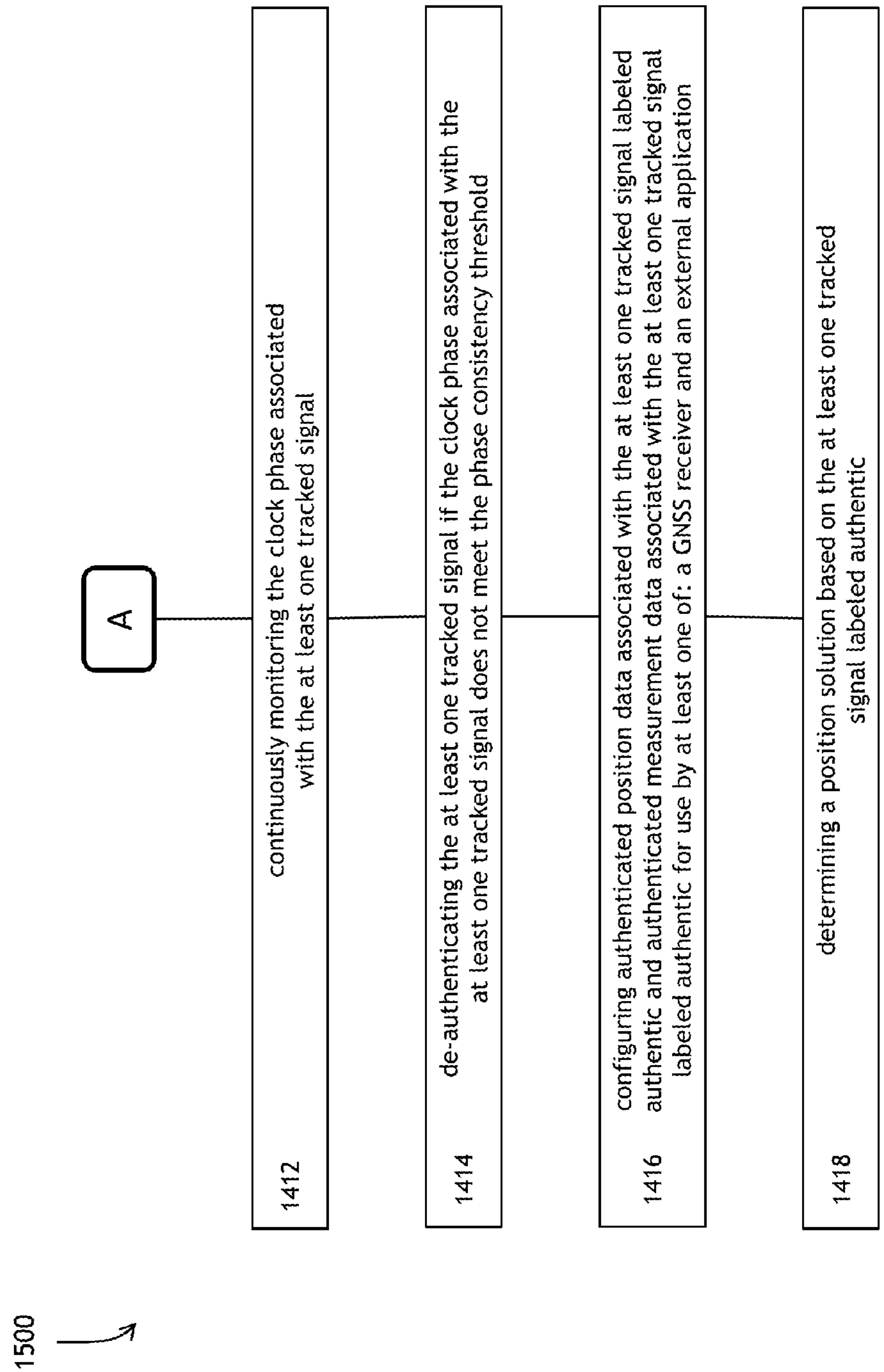

Referring to FIGS. 14 and 15, a flow chart of a method for authenticating received signals illustrative of an embodiment of the present invention is shown. Method 1400 may begin at step 1402 with receiving, acquiring and tracking at least one signal, and at step 1404, analyzing a clock phase associated with at least one tracked signal, and at step 1406, determining if the clock phase associated with the at least one tracked signal meets a phase consistency threshold, and at step 1408, labeling the at least one tracked signal as authentic if the clock phase associated with the at least one tracked signal meets the phase consistency threshold, and at step 1410, tracking at least one of the at least one tracked signal labeled authentic, and at step 1412, continuously monitoring the clock phase associated with the at least one tracked signal, and at step 1414, de-authenticating the at least one tracked signal if the clock phase associated with the at least one tracked signal does not meet the phase consistency threshold, and at step 1416, configuring authenticated position data associated with the at least one tracked signal labeled authentic and authenticated measurement data associated with the at least one tracked signal labeled authentic for use by at least one of: a GNSS receiver and an external application, and at step 1418, determining a position solution based on the at least one tracked signal labeled authentic.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for autonomous authentication of a received signal, comprising:
- receiving at least one signal;
- acquiring and tracking the at least one signal;
- analyzing a clock phase associated with at least one tracked signal, the analyzing including:
  - receiving at least one consistent measurement data set;
  - buffering the at least one consistent measurement data set;
  - determining a clock state estimate via at least one least squares solution from a fixed satellite vehicle set;
  - determining at least one Allan Variance sample point;
  - determining at least one confidence interval;
  - comparing the at least one Allan Variance sample point and the at least one confidence interval to a threshold;
  - labeling as authentic the at least one consistent measurement data set if the comparing meets the threshold;
  - labeling as unauthentic the at least one consistent measurement data set if the comparing fails to meet the threshold; and
  - configuring the authentic at least one consistent measurement data set for positioning system use;
- determining if the clock phase associated with the at least one tracked signal meets a phase consistency threshold;
- labeling the at least one tracked signal as authentic if the clock phase associated with the at least one tracked signal meets the phase consistency threshold;
- tracking at least one of the at least one tracked signal labeled authentic;
- continuously monitoring the clock phase associated with the at least one tracked signal;
- de-authenticating the at least one tracked signal if the clock phase associated with the at least one tracked signal does not meet the phase consistency threshold;
- configuring authenticated position data associated with the at least one tracked signal labeled authentic and authenticated measurement data associated with the at least one tracked signal labeled authentic for use by at least one of: a GNSS receiver and an external application; and
- determining a position solution based on the at least one tracked signal labeled authentic.

2. The method for autonomous authentication of a received signal of claim 1, wherein the at least one tracked signal is one of: a plurality of signals emitted from a satellite vehicle and a plurality of deceptive signals imitating signals emitted from a satellite vehicle.

3. The method for autonomous authentication of a received signal of claim 1, further comprising:
- comparing a unique satellite identification associated with at least one tracked signal to the unique satellite identification associated with a second of the at least one tracked signal;
- determining a consistent and authentic measurement data set associated with the at least one tracked signal using a data set measurement analysis if the comparing reveals a presence of repeated unique satellite identification; and
- determining an authentic measurement data set associated with the at least one tracked signal using a clock stability analysis if the comparing reveals no presence of repeated unique satellite identification.

4. The method for autonomous authentication of a received signal of claim 3, wherein the data set measurement analysis further comprises:
- determining if the data set measurement associated with the at least one tracked signal meets a data set threshold;
- labeling the at least one tracked signal as consistent if the data set measurement associated with the at least one tracked signal meets the data set threshold;
- continuously monitoring the data set measurement associated with the consistent at least one tracked signal; and
- declaring the at least one tracked signal inconsistent if the data set measurement associated with the at least one tracked signal does not meet the data set threshold.

5. The method for autonomous authentication of a received signal of claim 4, wherein continuously monitoring the data set measurement and the clock phase associated with the at least one tracked signal further comprises continuous multi-track monitoring.

6. The method for autonomous authentication of a received signal of claim 3, wherein the data set measurement analysis further includes an analysis of an effect of the receiver clock.

7. The method for autonomous authentication of a received signal of claim 3, wherein the data set measurement analysis further comprises:

receiving at least one set of carrier phase data;

buffering the at least one set of carrier phase data;

creating at least one combination of carrier phase data sets, the at least one combination including at least two of: a first data set having a first unique satellite identification, a second data set having the first unique satellite identification and a third data set having a second unique satellite identification, the carrier phase data sets including a first variable, the first variable associated with a unique satellite vehicle identification, the at least one combination including the first variable;

comparing each of the at least one combination of carrier phase data sets with a statistic norm of a post fit residuals;

discarding one of the at least one combination of carrier phase data sets if the at least one combination of carrier phase data sets exceeds a test statistic threshold;

determining an Allan Variance of a remaining at least one combination of carrier phase data sets;

labeling as consistent the remaining combination of carrier phase data sets; and configuring the consistent combination of carrier phase data sets for positioning system use.

8. The method for autonomous authentication of a received signal of claim 1, wherein analyzing a clock phase associated with at least one tracked signal further comprises use of at least one of an Allan Variance analysis, a confidence interval and an Overlapped Allan Variance analysis.

9. A system for autonomous authentication of a received positioning signal, comprising:

a positioning signal receiver, the positioning signal receiver having a non-transitory computer readable medium having non-transitory computer readable program code embodied therein for autonomous authentication of a received positioning signal, the computer readable program code comprising instructions which, when executed by a computer device or processor, perform and direct the steps of:

receiving at least one signal;

acquiring and tracking the at least one signal;

analyzing a clock phase associated with at least one tracked signal, the analyzing including:

receiving at least one consistent measurement data set;

buffering the at least one consistent measurement data set;

determining a clock state estimate via at least one least squares solution from a fixed satellite vehicle set;

determining at least one Allan Variance sample point;

determining at least one confidence interval;

comparing the at least one Allan Variance sample point and the at least one confidence interval to a threshold;

labeling as authentic the at least one consistent measurement data set if the comparing meets the threshold;

labeling as unauthentic the at least one consistent measurement data set if the comparing fails to meet the threshold; and configuring the authentic at least one consistent measurement data set for positioning system use;

determining if the clock phase associated with the at least one tracked signal meets a phase consistency threshold;

labeling the at least one tracked signal as authentic if the clock phase associated with the at least one tracked signal meets the phase consistency threshold;

tracking at least one of the at least one tracked signal labeled authentic;

continuously monitoring the clock phase associated with the at least one tracked signal;

de-authenticating the at least one tracked signal if the clock phase associated with the at least one tracked signal does not meet the phase consistency threshold;

configuring authenticated position data associated with the at least one tracked signal labeled authentic and authenticated measurement data associated with the at least one tracked signal labeled authentic for use by at least one of: a GNSS receiver and an external application; and determining a position solution based on the at least one tracked signal labeled authentic.

10. The system for autonomous authentication of a received positioning signal of claim 9, wherein the at least one tracked signal is one of: a plurality of signals emitted from a satellite vehicle and a plurality of deceptive signals imitating signals emitted from a satellite vehicle.

11. The system for autonomous authentication of a received positioning signal of claim 9, further comprising:

comparing a unique satellite identification associated with at least one tracked signal to the unique satellite identification associated with a second of the at least one tracked signal;

determining a consistent and authentic measurement data set associated with the at least one tracked signal using a data set measurement analysis if the comparing reveals a presence of repeated unique satellite identification; and determining an authentic measurement data set associated with the at least one tracked signal using a clock stability analysis if the comparing reveals no presence of repeated unique satellite identification.

12. The system for autonomous authentication of a received positioning signal of claim 11, wherein the data set measurement analysis further comprises:

determining if the data set measurement associated with the at least one tracked signal meets a data set threshold;

labeling the at least one tracked signal as consistent if the data set measurement associated with the at least one tracked signal meets the data set threshold;

continuously monitoring the data set measurement associated with the consistent at least one tracked signal; and declaring the at least one tracked signal inconsistent if the data set measurement associated with the at least one tracked signal does not meet the data set threshold.

13. The system for autonomous authentication of a received positioning signal of claim 11, wherein the data set measurement analysis further comprises:

receiving at least one set of carrier phase data;

buffering the at least one set of carrier phase data;

creating at least one combination of carrier phase data sets, the at least one combination including at least two of: a first data set having a first unique satellite identification, a second data set having the first unique satellite identification and a third data set having a second unique satellite identification, the carrier phase data sets including a first variable, the first variable associated with a unique satellite vehicle identification, the at least one combination including the first variable;

comparing each of the at least one combination of carrier phase data sets with a statistic norm of a post fit residuals;

discarding one of the at least one combination of carrier phase data sets if the at least one combination of carrier phase data sets exceeds a test statistic threshold;

determining an Allan Variance of a remaining at least one combination of carrier phase data sets;

labeling as consistent the remaining combination of carrier phase data sets; and configuring the consistent combination of carrier phase data sets for positioning system use.

14. The system for autonomous authentication of a received positioning signal of claim 11, wherein the data set measurement analysis further includes an analysis of an effect of the receiver clock.

15. The system for autonomous authentication of a received positioning signal of claim 9, wherein analyzing a clock phase associated with at least one tracked signal further comprises use of at least one of an Allan Variance analysis, a confidence interval and an Overlapped Allan Variance analysis.

16. The system for autonomous authentication of a received positioning signal of claim 9, wherein continuously monitoring the stability of the clock phase estimate associated with the at least one tracked signal further comprises continuous multi-track monitoring.

17. A method for automated autonomous authentication of a received positioning signal, comprising:

means for receiving at least one signal;

means for acquiring and tracking the at least one signal;

means for optionally analyzing a data set measurement associated with the at least one tracked signal;

means for optionally determining if the data set measurement associated with the at least one tracked signal meets a data set threshold;

means for optionally labeling the at least one tracked signal as consistent if the data set measurement associated with the at least one tracked signal meets the data set threshold;

means for analyzing a clock phase associated with at least one tracked signal, the means for analyzing including:

means for receiving at least one consistent measurement data set;

means for buffering the at least one consistent measurement data set;

means for determining a clock state estimate via at least one least squares solution from a fixed satellite vehicle set;

means for determining at least one Allan Variance sample point;

means for determining at least one confidence interval;

means for comparing the at least one Allan Variance sample point and the at least one confidence interval to a threshold;

means for labeling as authentic the at least one consistent measurement data set if the comparing meets the threshold;

means for labeling as unauthentic the at least one consistent measurement data set if the comparing fails to meet the threshold; and means for configuring the authentic at least one consistent measurement data set for positioning system use;

means for determining if the clock phase associated with the at least one tracked signal meets a phase consistency threshold;

means for labeling the at least one tracked signal as authentic if the clock phase associated with the at least one tracked signal meets the phase consistency threshold;

means for tracking at least one of the at least one tracked signal labeled at least one of: consistent and authentic;

means for continuously monitoring the data set measurement and the clock phase associated with the at least one tracked signal;

means for declaring the at least one tracked signal inconsistent if the data set measurement associated with the at least one tracked signal does not meet the data set threshold;

means for de-authenticating the at least one tracked signal if the clock phase associated with the at least one tracked signal does not meet the phase consistency threshold;

means for configuring authenticated position data associated with the at least one tracked signal labeled authentic and authenticated measurement data associated with the at least one tracked signal labeled authentic for use by at least one of: a GNSS receiver and an external application; and means for determining a position solution based on the at least one tracked signal labeled one of: consistent and authentic.

18. The method for automated autonomous authentication of a received positioning signal of claim 17, wherein the at least one tracked signal is one of: a plurality of signals emitted from a satellite vehicle and a plurality of deceptive signals imitating signals emitted from a satellite vehicle.

19. The method for automated autonomous authentication of a received positioning signal of claim 17, wherein the data set measurement further includes an effect of the receiver clock.

20. The method for automated autonomous authentication of a received positioning signal of claim 17, wherein means for continuously monitoring the stability of the clock phase estimate associated with the at least one tracked signal further comprises continuous multi-track monitoring.

21. The method for automated autonomous authentication of a received positioning signal of claim 17, wherein means for optionally analyzing a data set measurement associated with the at least one tracked signal further comprises receiving at least one set of carrier phase data;

buffering the at least one set of carrier phase data;

creating at least one combination of carrier phase data sets, the at least one combination including at least two of: a first data set having a first unique satellite identification, a second data set having the first unique satellite identification and a third data set having a second unique satellite identification, the carrier phase data sets including a first variable, the first variable associated with a unique satellite vehicle identification, the at least one combination including the first variable;

comparing each of the at least one combination of carrier phase data sets with a statistic norm of a post fit residuals;

discarding one of the at least one combination of carrier phase data sets if the at least one combination of carrier phase data sets exceeds a test statistic threshold;

determining an Allan Variance of a remaining at least one combination of carrier phase data sets;

labeling as consistent the remaining combination of carrier phase data sets; and configuring the consistent combination of carrier phase data sets for positioning system use.

* * * * *